United States Patent
Leong et al.

(10) Patent No.: US 10,579,226 B2
(45) Date of Patent: Mar. 3, 2020

(54) TIME PROXIMITY BASED MAP USER INTERACTIONS

(71) Applicant: Google Inc., Mountain View, CA (US)

(72) Inventors: Su Chuin Leong, Oakland, CA (US); Daniel Ruston, Mountain View, CA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 15/708,552

(22) Filed: Sep. 19, 2017

(65) Prior Publication Data

US 2019/0087058 A1 Mar. 21, 2019

(51) Int. Cl.
| | |
|---|---|
| *G06F 3/048* | (2013.01) |
| *G06F 3/0483* | (2013.01) |
| *G06F 3/0485* | (2013.01) |
| *G01C 21/26* | (2006.01) |
| *G01C 21/36* | (2006.01) |
| *G06F 16/29* | (2019.01) |
| *G06Q 10/10* | (2012.01) |
| *G06F 3/0484* | (2013.01) |

(Continued)

(52) U.S. Cl.
CPC ......... *G06F 3/0483* (2013.01); *G01C 21/265* (2013.01); *G01C 21/3664* (2013.01); *G01C 21/3697* (2013.01); *G06F 3/0485* (2013.01); *G06F 16/29* (2019.01); *G06Q 10/1095* (2013.01); *G06F 3/04847* (2013.01); *G06Q 10/02* (2013.01); *G06Q 10/047* (2013.01); *G06T 11/60* (2013.01); *G06T 2200/24* (2013.01)

(58) Field of Classification Search
None
See application file for complete search history.

(56) References Cited

U.S. PATENT DOCUMENTS 8,605,094 B1 * 12/2013 Alfaro .................... G06T 11/60
345/440
9,585,988 B2    3/2017 McJames et al.
(Continued)

FOREIGN PATENT DOCUMENTS

EP        2150034        2/2010

OTHER PUBLICATIONS

Chi-Yi Lin et al., A Location-based Personal Task Management Application for Indoor and Outdoor Environments, Sep. 1, 2012, IEEE, pp. 582-586 (Year: 2012).*

(Continued)

*Primary Examiner* — Tam T Tran
(74) *Attorney, Agent, or Firm* — Dority & Manning, P.A.

(57) ABSTRACT

Systems and methods for time proximity based map user interactions with a user interface are provided. In one example implementation, a method includes providing for display a user interface on a display device. The user interface can display imagery of a geographic area. The method can include obtaining data indicative of a relevant time for contextual information. The method can include obtaining contextual information associated with the geographic area. The method can include obtaining a configuration for a user interface element associated with the time based contextual information based at least in part on time proximity of the contextual information to the relevant time. The method can include providing for display the user interface element based at least in part on the configuration.

20 Claims, 11 Drawing Sheets

(51) Int. Cl.
*G06T 11/60* (2006.01)
*G06Q 10/02* (2012.01)
*G06Q 10/04* (2012.01)

(56) References Cited

U.S. PATENT DOCUMENTS

| | | | |
|---|---|---|---|
| 2004/0153509 A1* | 8/2004 | Alcorn | G06Q 30/06 709/205 |
| 2008/0109718 A1* | 5/2008 | Narayanaswami | G06Q 10/109 715/262 |
| 2010/0216491 A1* | 8/2010 | Winkler | G06Q 10/10 455/457 |
| 2013/0317665 A1* | 11/2013 | Fernandes | G08G 5/0039 701/1 |
| 2014/0316835 A1 | 10/2014 | Cortes et al. | |
| 2015/0187127 A1* | 7/2015 | Jones | G06T 19/20 345/426 |
| 2017/0169363 A1* | 6/2017 | Salmasi | H04W 4/21 |
| 2017/0344948 A1* | 11/2017 | Kumar | G06Q 50/24 |
| 2018/0005434 A1* | 1/2018 | Ren | G06T 17/05 |
| 2018/0341394 A1* | 11/2018 | Sangli | G06F 3/04847 |

OTHER PUBLICATIONS

Sushil J Louis et al., Conext Learning Can Improve User Interaction, Jan. 1, 2004, IEEE, pp. 115-120 (Year: 2004).*
International Search Report with Written Opinion for PCT/US2018/032038 dated Jul. 23, 2018, 10 pages.

* cited by examiner

TIME PROXIMITY BASED MAP USER INTERACTIONS

FIELD

The present disclosure relates generally to user interfaces for geographic information system applications, such as mapping applications.

BACKGROUND

Geographic information systems (GIS) can store, index, obtain, and/or retrieve data according to geographic coordinates of its elements. GIS applications can include, for instance, mapping applications that display imagery (e.g., map imagery, satellite imagery, three-dimensional models, etc.) of a geographic area. GIS applications can be used for a variety of purposes, such as for navigation, searching of relevant information associated with a geographic area, etc. GIS applications can also provide and/or include contextual information associated with the imagery. For instance, the GIS application can include and/or provide information associated with points of interest, events, and/or users of the GIS application. The contextual information can be provided for display in conjunction with imagery of the geographic area to enrich the imagery and/or to facilitate user interaction with the GIS application.

SUMMARY

Aspects and advantages of embodiments of the present disclosure will be set forth in part in the following description, or may be learned from the description, or may be learned through practice of the embodiments One example aspect of the present disclosure is directed to a computer-implemented method for processing user interface elements associated with contextual information in a geographic information system. The method includes providing for display, by one or more computing devices, a user interface on a display device. The user interface can display imagery of a geographic area. The method can include obtaining, by the one or more computing devices, data indicative of a relevant time for contextual information. The method can include obtaining, by the one or more computing devices, contextual information associated with the geographic area. The method can include obtaining, by the one or more computing devices, a configuration for a user interface element associated with the time based contextual information based at least in part on time proximity of the contextual information to the relevant time. The method can include providing for display, by the one or more computing devices, the user interface element based at least in part on the configuration.

Other example aspects of the present disclosure are directed to systems, apparatus, tangible, non-transitory computer-readable media, and devices associated with user interactions in GIS applications.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
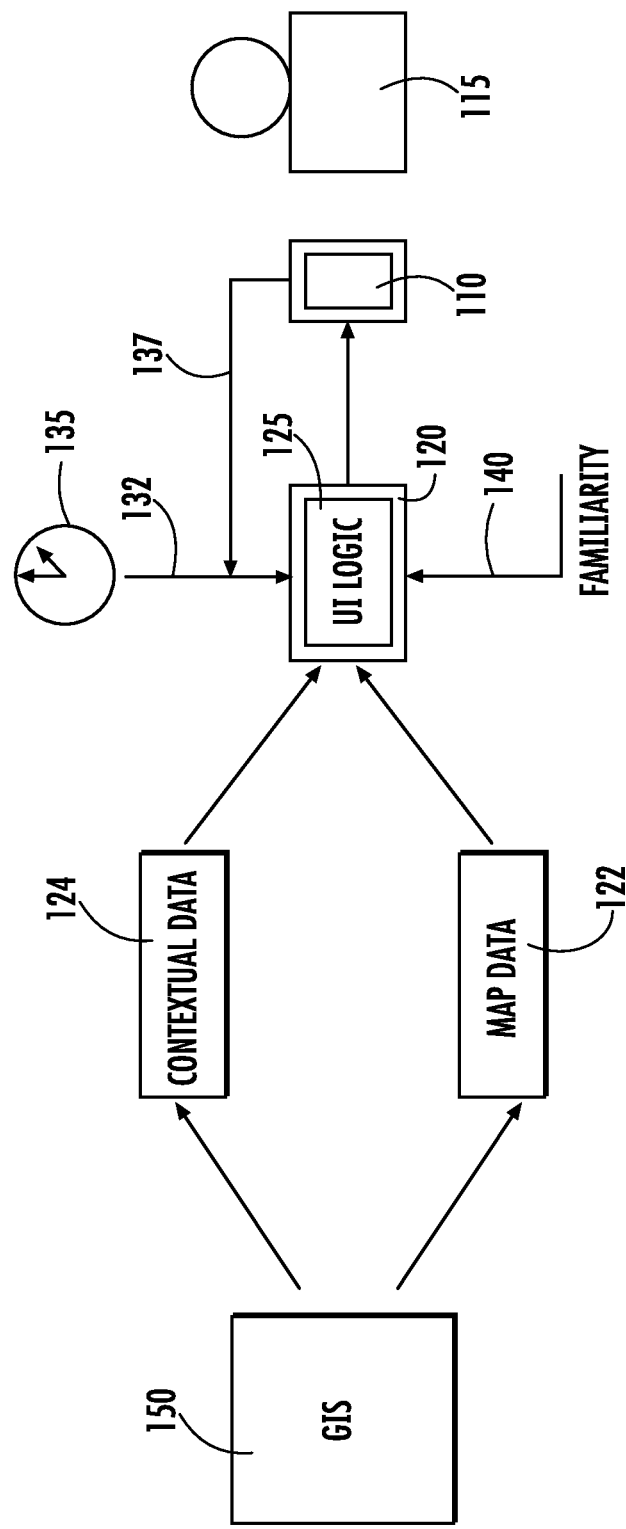
FIG. 1 depicts an overview of an example system for implementing a user interface associated with a GIS application according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for implementing time based contextual information in a user interface associated with geographic information system (GIS) applications, such as mapping applications, to obtain more efficient user inputs. More particularly, the user interface can display contextual information (e.g., cards, callouts, icons, etc.) and/or map information in conjunction with imagery or other data associated with a geographic area (e.g., a map). The contextual information and/or map information can be associated with a particular date and time. In some embodiments, contextual information associated with a particular date and time can be selected and/or prioritized for receiving user interaction relative to contextual information associated with a different date and time. In this way, the GIS application can be configured to tailor the user interface to provide more efficient interactions from a user based on time proximity of contextual information.

For instance, in some embodiments, the user interface can be configured to display imagery of a geographic area, such as a map of the geographic area or other imagery (e.g., satellite imagery, street level imagery, three-dimensional models, aerial imagery, etc.) Contextual information associated with time based events can be displayed in conjunction with the imagery. The contextual information can be associated with a particular date and time. Contextual information can include, for instance, information associated with dinner reservations, travel information (e.g., flight times), calendar information (e.g., meetings, appointments, etc.), events (e.g., concerts, festivals, fairs, rallies), suggested activities, suggested trips, etc. For instance, in some embodiments, the contextual information can be associated with personalized information of a user, such as a user's appointments, commute, schedule, calendar, reservations, etc.

In some embodiments, the contextual information can be provided in the user interface as user interface elements capable of receiving a user interaction (e.g., a touch input, click input, swipe input, or other gesture indicative of a user interaction). In response to the user interaction, the user interface can be modified to provide details or other interface elements associated with the contextual information.

In some implementations, to obtain the benefits of the techniques described herein, the user may be required to allow the analysis of data for transmission over a communication channel, or other information associated with a user or user's computing device or communication device. Therefore, in some implementations, users can be provided with an opportunity to control settings associated with whether programs or features collect such information. If the user does not allow collection and use of such information, then the user may not receive the benefits of the techniques described herein. In some implementations, the user can also be provided with tools to revoke or modify consent. In addition, in some implementations, certain information or data can be treated in one or more ways before it is stored or used, so that personally identifiable information is removed.

According to example aspects of the present disclosure, user interface elements for contextual information associated with dates and times closer to a current or selected date and time can be prioritized higher relative to information associated with further away dates. Configurations for user interface elements associated with the contextual information can be determined so that higher prioritized information is featured with higher prominence and easier for user interaction relative to other information and/or interface elements.

As one example, contextual information can be provided with different user interface element treatments based on the time proximity associated with the contextual information. For instance, contextual information closer in time proximity can be provided with higher prominence (e.g., as a card user interface element). Contextual information further away in time proximity can be configured for display with lower prominence (e.g., as smaller icons, off screen so that the user has to scroll the see the information, etc.).

As time progresses, the user interface associated with the GIS application can adapt (e.g., without further user interaction) to display different and/or display with higher prominence contextual information depending on time proximity of the information. As time progresses to dates and times closer in time proximity to contextual information, the contextual information becomes prioritized relative to other contextual information. As a result, the user interface is automatically adapted as time progresses to prioritize user interface elements for user interaction based on time proximity.

As one example, a user interface can be configured to display an icon associated with "Pete's Restaurant" based on a dinner reservation for a user at Pete's Restaurant. A week out from the time associated with the dinner reservation, the user interface can be configured to display text providing a date and time associated with the dinner reservation in conjunction with the icon (e.g., Wednesday at 8:30). On the day of the dinner reservation, the user interface can be configured to display a callout in conjunction with the restaurant. The callout is more prominently displayed relative to the icon. In addition, the user can interact with the callout to obtain more information about the restaurant (e.g., menu, reviews, busiest times, etc.). Within a few hours of the time associated with the dinner reservation, the user interface can display more information, such as travel directions to the restaurant.

In some embodiments, a plurality of user interface elements can be organized in the user interface based at least in part on time proximity to a current time. For instance, user interface elements can be grouped into a plurality of relevant time groups. The relevant time groups can be associated with discrete time periods. For instance, the relevant time groups can include one or more of a this morning time group, today time group, tonight time group, this week time group, this weekend time group, next month time group, etc.

The this morning time group can be associated with contextual information relevant for this morning. The today time group can be associated with contextual information relevant for today. The tonight time group can be associated with contextual information relevant for tonight or this evening. The this week time group can be associated with contextual information relevant for this week. The this weekend time group can be associated with contextual information relevant for this weekend. The next month time group can be associated with contextual information relevant for next month, and so forth.

In some embodiments, the user interface can be configured to receive a user interaction to change the relevant time for display of time based contextual information. As the user changes the relevant time, different time based contextual information is prioritized for display in conjunction with the geographic area. In this way, time can be treated as a lens to view different information as the user interacts with the user interface.

Various user interactions can be implemented to change the relevant time for display of time based contextual information. For instance, in some embodiments, the user can simply scroll (e.g., vertically and/or horizontally) to change the relevant time for display of information. In one example, by scrolling down vertically, the user interface can display information associated with time further in time proximity to the relevant time. For instance, the user can view user interface elements associated with different relevant time groups further in proximity from the relevant time.

By scrolling horizontally or performing some other user interaction, the user can change the relevant time. For instance, the user can change the display of contextual information proximate the current time to the display of contextual information associated with a later time (e.g., the weekend) by scrolling horizontally.

In some embodiments, a relevant time change interface element can be provided in conjunction with the imagery to allow the user to change the relevant time for display of contextual information. For instance, a semi-transparent circular element can be provided for display overlaying the imagery. The user can change the relevant time for display of contextual information by interacting with the circular element. As an example, rotating a marker about the interface element in a clockwise direction can advance the relevant time towards the future. Rotating the marker about the interface element in a counter-clockwise direction can advance the relevant time backwards.

In response to changing of the relevant time by the user, user interface elements associated with different contextual information can be displayed in conjunction with the imagery. For instance, a user can interact with an interface element to advance a relevant time from a current time to a time associated with the upcoming weekend. The user interface can change the display of contextual information to prioritize user interface elements associated with contextual information in time proximity to the upcoming weekend relative to other times. Different points of interest, different colors, and/or different display elements can be provided in conjunction with the imagery as the user changes the relevant time.

In some embodiments, the user interface can be configured to change the display of the geographic imagery itself in response to a user interaction changing the relevant time. For instance, as the relevant time changes to a time later in the future, the geographic imagery can be zoomed out to display more information associated with a wider geographic area. This can accommodate the ability of the user to travel over a larger geographic area over the course of time. In this way, the map imagery itself can be modified to display potentially more relevant information to the user based on time.

In some embodiments, the user interface can provide contextual information in conjunction with the imagery based at least in part on user familiarity with a particular geographic area. For instance, based on information associated with the user (e.g., historical user data, preferences submitted by the user, user settings, user location history, etc.) a signal indicative of user familiarity with a geographic area can be determined. Different contextual information can be given different treatment in the user interface based at least in part on the signal indicative user familiarity. For instance, the GIS application can provide increased user interface elements associated with assistance of the user in traveling and conducting tasks (e.g., eating, attending a meeting, etc.) in the geographic area if it is determined that the user is in an unfamiliar area. The GIS application can provide decreased user interface elements associated with assistance of the user in the geographic area if it is determined that the user is in a familiar space.

Example aspects of the present disclosure have a number of technical effects and benefits. For instance, by automatically configuring a user interface associated with a GIS application to provide contextual information based on time proximity, information can be processed by the GIS application with fewer user interactions, leading to preservation of memory and processing resources. More particularly, relevant contextual information can be provided for user interaction without requiring multiple user inputs (e.g., search queries, selection inputs, etc.) to locate the information. Because less user inputs are required to obtain relevant information, processing and memory storage resources can be preserved for other aspects of computing technology (e.g., communication of information over a network) used to implement the GIS application.

One example aspect of the present disclosure is directed to a computer-implemented method for processing user interactions in a geographic information system. The method includes displaying, by a computing device using a display unit, a user interface displaying geographic imagery of a geographic area. Responsive to receiving an input indicative of a relevant time for display of contextual information the method includes requesting, by the computing device using a communication unit, time based contextual information associated with the geographic area; and requesting, by the computing device using the communication unit, one or more display configurations for the time based contextual information based at least in part on time proximity of the contextual information to the relevant time. Responsive to receiving time based contextual information and one or more display configurations, the method includes displaying, by the computing device using the display unit, received contextual information in conjunction with the geographic imagery based at least in part on the received one or more display configurations.

In some embodiments, the relevant time includes a current time. In some embodiments, the method includes adjusting, by the computing device, the one or more display configurations for the contextual information as the relevant time changes from a first time to a second time, the second time being later than the first time. In some embodiments, the method includes adjusting the one or more display configurations comprises adjusting, by the computing device, a user interface treatment of the contextual information. In some embodiments, the method includes adjusting, by the computing device, the geographic imagery displayed in the user interface as the relevant time changes from a first time to a second time. Adjusting the geographic imagery can include zooming the geographic imagery.

In some embodiments, the method includes responsive to receiving, by the computing device using an input unit, data indicative of a first type of user interaction directed to the user interface, displaying, by the computing device, different time based contextual information in conjunction with the geographic imagery. In some embodiments, the first type of user interaction includes a vertical scrolling user interaction.

In some embodiments, responsive to receiving, by the computing device using an input unit, data indicative of a second type of user interaction directed to the user interface, the method includes adjusting, by the computing device, the relevant time from a first time to a second time. The method includes adjusting, by the computing device, the one or more display configurations for the contextual information as the relevant time changes from the first time to the second time, the second time being later than the first time. In some embodiments, the method includes displaying, by the computing device using the display unit, a user interface element configured to receive the second type of user interaction for adjusting the relevant time. The user interface element can include a circular interface element.

In some embodiments, the one or more display configurations are obtained, at least in part, based at least in part on data indicative of a user familiarity with the geographic area.

In some embodiments, a computer-readable medium can include instructions which, when executed by a processor, cause the processor to carry out one or more aspects of any of the methods described herein.

FIG. 1 depicts an overview of an example system according to example embodiments of the present disclosure. The system can be configured to change the configuration of a user interface 110 associated with a geographic information system application 120. The GIS application 120 can be, for instance, a mapping application, navigation application, virtual globe application, etc. The GIS application 120 can be implemented on one or more computing devices.

In some embodiments, the GIS application 120 can be implemented on a mobile computing device that is capable of being carried by a user (e.g., in the user's hand) during operation. Example mobile computing devices can include, for instance, smartphones, tablets, display devices with one or more processors, wearable devices, PDAs, smart watches, smart glasses, laptops, or other devices.

According to example aspects of the present disclosure, the arrangement of user interface elements capable of receiving a user interaction from a user 115 in the user interface 110 can be determined based on time proximity and/or user familiarity to provide for more efficient user interaction with the user interface 110. More particularly, UI logic 125 can obtain map data 122 and/or contextual data 124 from a geographic information system 150. In some embodiments, the GIS 150, the map data 122 and/or the contextual data 124 can be stored or implemented locally in one or more memory devices associated with the computing device implementing the GIS application 120. In some embodiments, the GIS 150, the map data 122, and/or the contextual data 124 can be stored or implemented on one or more other computing devices (e.g., a server). The map data 122 and/or the contextual data 124 can be communicated, for instance, from the GIS 150 as data packets over a network (e.g., the Internet).

The map data 122 can include, for instance, data used to render imagery of a geographic area (e.g., map imagery, satellite imagery, aerial imagery, three-dimensional models, etc.). The map data 122 can also include data used to enrich the imagery, such as data associated with points of interest, locals, etc.

The contextual data 124 can be contextual data to be provided in conjunction with the map data 124. In some embodiments, the contextual data 124 can be associated with a particular date and time. Example time based contextual information can include, for instance, information associated with dinner reservations, travel information (e.g., flight times), calendar information (e.g., meetings, appointments, etc.), events (e.g., concerts, festivals, fairs, rallies), suggested activities, suggested trips, etc. For instance, in some embodiments, the contextual information can be associated with personalized information of a user, such as a user's appointments, commute, schedule, calendar, reservations, etc.

UI logic 125 can obtain a signal 132 indicative of a relevant time. In some embodiments, the signal 132 indicative of the relevant time can be a signal indicative of a current time 135 (e.g., from a real time clock). In some embodiments, the signal 132 indicative of the relevant time 132 can be based at least in part on a user interaction with the user interface 110. For instance, a user 115 can interact with the user interface 110 to provide a signal 137 used to change the signal 132 indicative of the relevant time (e.g., either forward or backward in time). The UI logic 125 can determine one or more configurations for user interface elements associated with the contextual information based at least in part on the signal 132 indicative of relevant time. For instance, as provided in example below, the UI logic 125 can determine configurations for user interface elements to prioritize user interaction based at least in part on time proximity of contextual information to the relevant time.

In some embodiments, the UI logic 125 can obtain a signal 140 indicative of user familiarity with a geographic area. The signal 140 can be determined based on information associated with the user 115, such as location history, browsing history, number of visits to a geographic area, search queries directed to the geographic area, distance to the geographic area from a user's home or place of business, the number of friends or social media connections tied to the geographic area, etc. The UI logic 125 can change one or more display configurations for user interface elements in the user interface 110 based at least in part on the signal 140. For instance, the UI logic 125 can provide increased user interface elements associated with assistance of the user in traveling and conducting tasks (e.g., eating, attending a meeting, etc.) in the geographic area if it is determined that the user is in an unfamiliar area. The UI logic 125 can provide decreased user interface elements associated with assistance of the user in the geographic area if it is determined that the user is in a familiar space.

The UI logic 125 can include computer-readable instructions that when executed by one or more processors cause the one or more processors to perform operations. The instructions can be implemented in software and/or hardware. When software is used, any suitable programming language can be used to implement the instructions. Example operations that can be performed by UI logic 125 are discussed with referenced to FIGS. 8 and 9 below. Example user interfaces that can be implemented by UI logic 125 will now be set forth.

Figure 2:
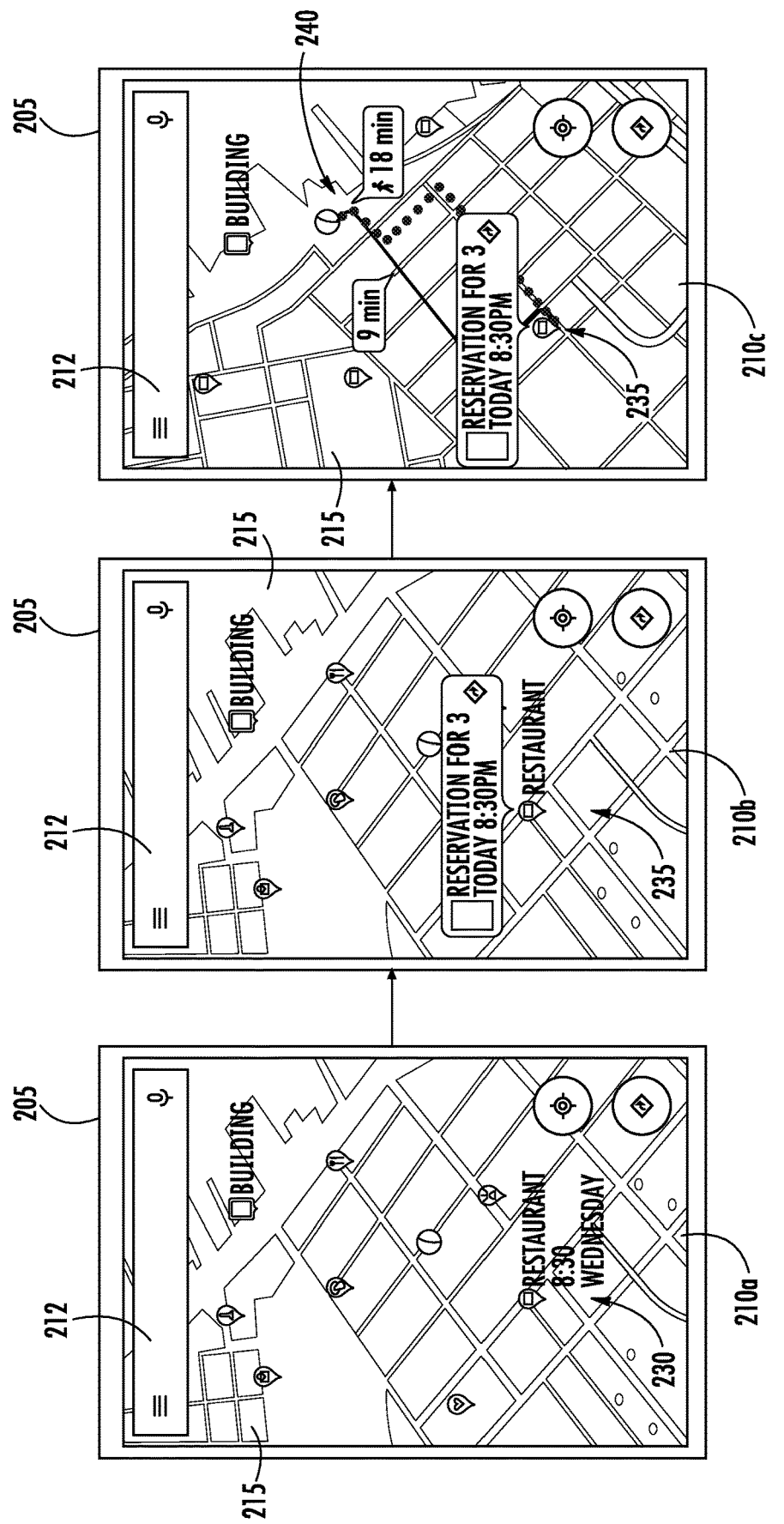
FIG. 2 depicts example implementation of one or more display configurations of contextual information in a user interface according to example embodiments of the present disclosure.

FIG. 2 depicts example user interfaces 210*a*, 210*b*, and 210*c* provided for display on a display device 205 according to example embodiments of the present disclosure. The user interfaces 210*a*, 210*b*, 210*c* can each include imagery 215 (e.g., map imagery) of a geographic area. The imagery 215 can include markers or other user interface elements for various points of interest. The user interfaces 210*a*, 210*b*, and 210*c* can also include search tool 212 for conducting search queries. Other interface elements can be included in the user interfaces 210*a*, 210*b*, and 210*c* without deviating from the scope of the present disclosure.

User interface 210*a*, user interface 210*b*, and user interface 210*c* are each associated with different relevant times. For instance, user interface 210*a* can be associated with a first relevant time. User interface 210*b* can be associated with a second relevant time that is later in the future relative to the first relevant time. User interface 210*c* can be associated with a third relevant time that is later in the future relative to the first relevant time and the second relevant time.

As shown in FIG. 2, one or more display configurations for user interface elements associated with contextual information can be modified as the relevant time progress from the first relevant time to the second relevant time and to the third relevant time. More particularly, user interface 210*a* associated with a first relevant time can present a user interface element 230 associated with contextual information directed to a dinner reservation at "Restaurant A." The contextual information can be associated with a date and time that is far in time proximity relative to the relevant time. For example, the dinner reservation can be for a time a week out from the relevant time. As shown, the interface element 230 includes a waypoint marker along with text describing the restaurant and the time of the reservation (e.g., 8:30 Wednesday).

As the relevant time progresses to the second relevant time (e.g., either through the natural progression of time or through manual modification of the relevant time via a user interface element), the interface element(s) associated with the contextual information can be modified to make user interaction with the contextual information more prominent as time proximity gets closer to the time associated with the contextual information. For example, user interface 210b can be associated with a relevant time that is the same day as the date and time associated with the contextual information directed to the dinner reservation at "Restaurant A." The user interface 210b presents an interface element 235 that is more prominent and capable of receiving user interaction relative to the interface element 230 in user interface 210a. In this example, the user interface 210b has been changed to include a callout interface element 235 that lists more information about the dinner reservation (e.g., "Dinner for 3"). Moreover, a user is capable of interacting with the callout interface element 235 (e.g., through a touch or click interaction) to obtain more information about the restaurant (e.g., a dinner menu, popular times, address, navigation directions, etc.).

As the relevant time progresses to the third relevant time, (e.g., either through the natural progression of time or through manual change of the relevant time via a user interface element), the interface element(s) associated with the contextual information can be changed to make user interaction with the contextual information even more prominent as time proximity gets closer to the time associated with the contextual information. For example, user interface 210c can be associated with a relevant time that is within one hour of the date and time associated with the contextual information directed to the dinner reservation at "Restaurant A." The user interface 210c presents interface element 235 that is capable of receiving user interaction relative to the interface element 230 in user interface 210a. In this example, the user interface 210c has been changed to include a callout interface element 235 that lists more information about the dinner reservation (e.g., "Dinner for 3"). Moreover, a user is capable of interacting with the callout interface element 235 (e.g., through a touch or click interaction) to obtain more information about the restaurant (e.g., a dinner menu, popular times, address, navigation directions, etc.).

In addition, the user interface 210c presents interface element(s) 240 associated with navigation directions to "Restaurant A." The interface element(s) 240 can include a walking route rendered in polyline with the imagery 215. In addition, the interface element(s) 240 can include approximate travel time (e.g., 18 minutes) to travel to "Restaurant A." A user can obtain more information about the navigation route and/or other navigation information by interacting with the interface elements 240. In that regard, within one hour of the dinner reservation at "Restaurant A," the user interface 210c is automatically modified to facilitate efficient user interaction with the GIS application (e.g., by providing multiple interface elements 235 and 240) to obtain information relevant to the dinner reservation.

According to example embodiments of the present disclosure, a user interface associated with a GIS application can organize interface elements associated with time based contextual information at least in part based on time proximity. For instance, the GIS application can organize interface elements in the user interface into relevant time groups, such as relevant time groups associated with this morning, this evening, tomorrow, this weekend, and so forth. A user can access interface elements for contextual information that is further in time proximity from the relevant time by performing a suitable user interaction with the user interface. For instance, a user can scroll (e.g., scroll vertically) to view information associated with contextual information that is further in time proximity from the relevant time.

Figure 3:
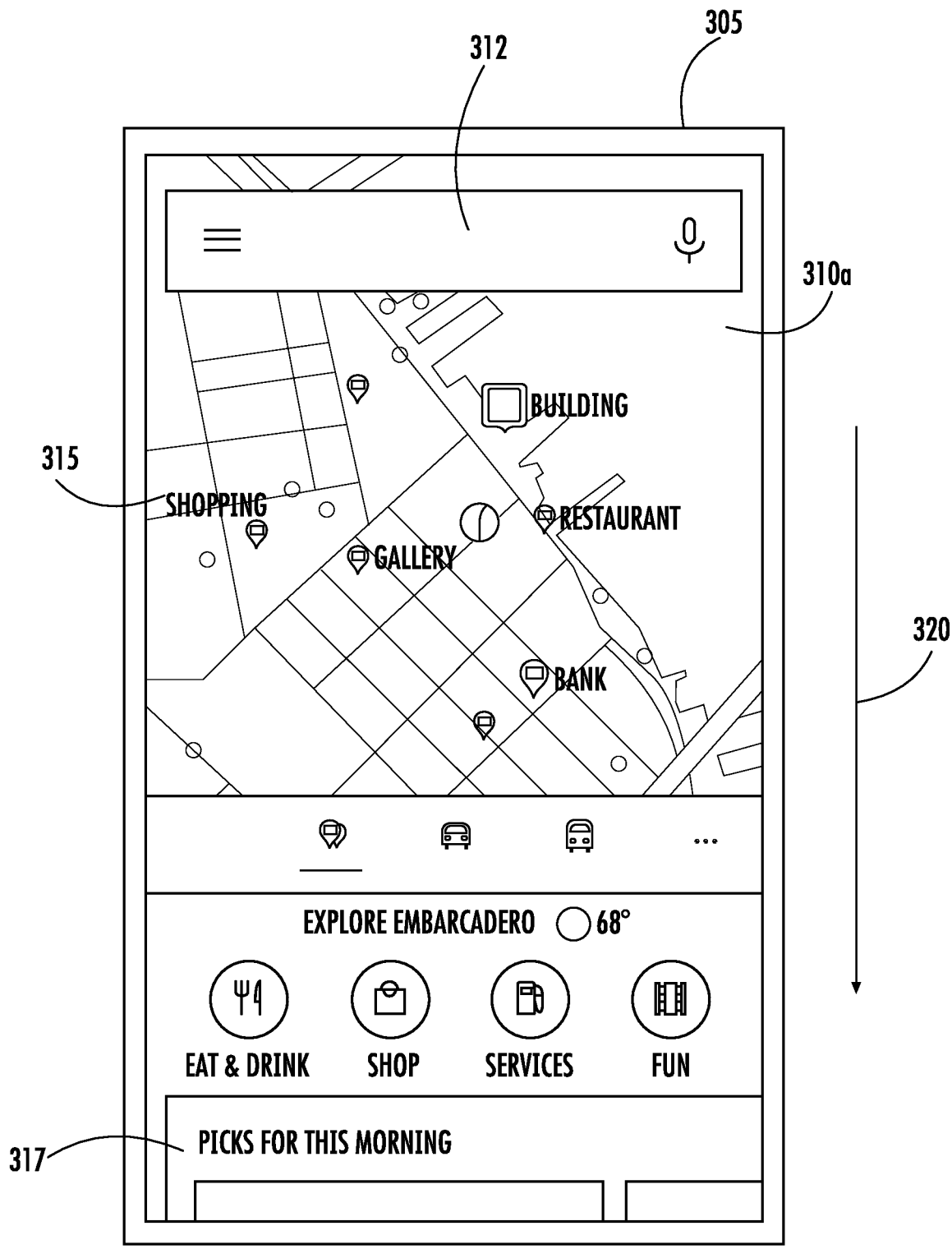
FIG. 3 depicts an example a user interface according to example embodiments of the present disclosure.

As one example, FIG. 3 depicts a portion of a user interface 310a for a GIS application on a display device 305. The user interface 310a provides imagery 315 of a geographic area (e.g., map imagery). The user interface 310a includes a search tool 312 for conducting search queries. The imagery 315 can include markers or other user interface elements for various points of interest.

As shown, a bottom portion of the user interface 310a extending off screen includes one or more card interface elements 317. Card interface elements 317 can present information associated with time based contextual information. For instance, card interface elements 317 can provide suggestions for "this morning." The suggestions can be, for instance, associated with breakfast spots, a place for a morning jog, a café, or other event. A user can obtain more information about the suggestions via a user interaction with the card interface elements 317 (e.g., via a touch or click interaction).

A user can access more contextual information organized based at least in part on time proximity via a user interaction, such as vertical scroll interaction 320. The vertical scroll interaction 320 can bring items in the user interface 310a that are currently off screen into view. According to example aspects of the present disclosure, a user can obtain information further in time proximity to a relevant time (e.g., the current time) as the user scrolls vertically.

Figure 4:
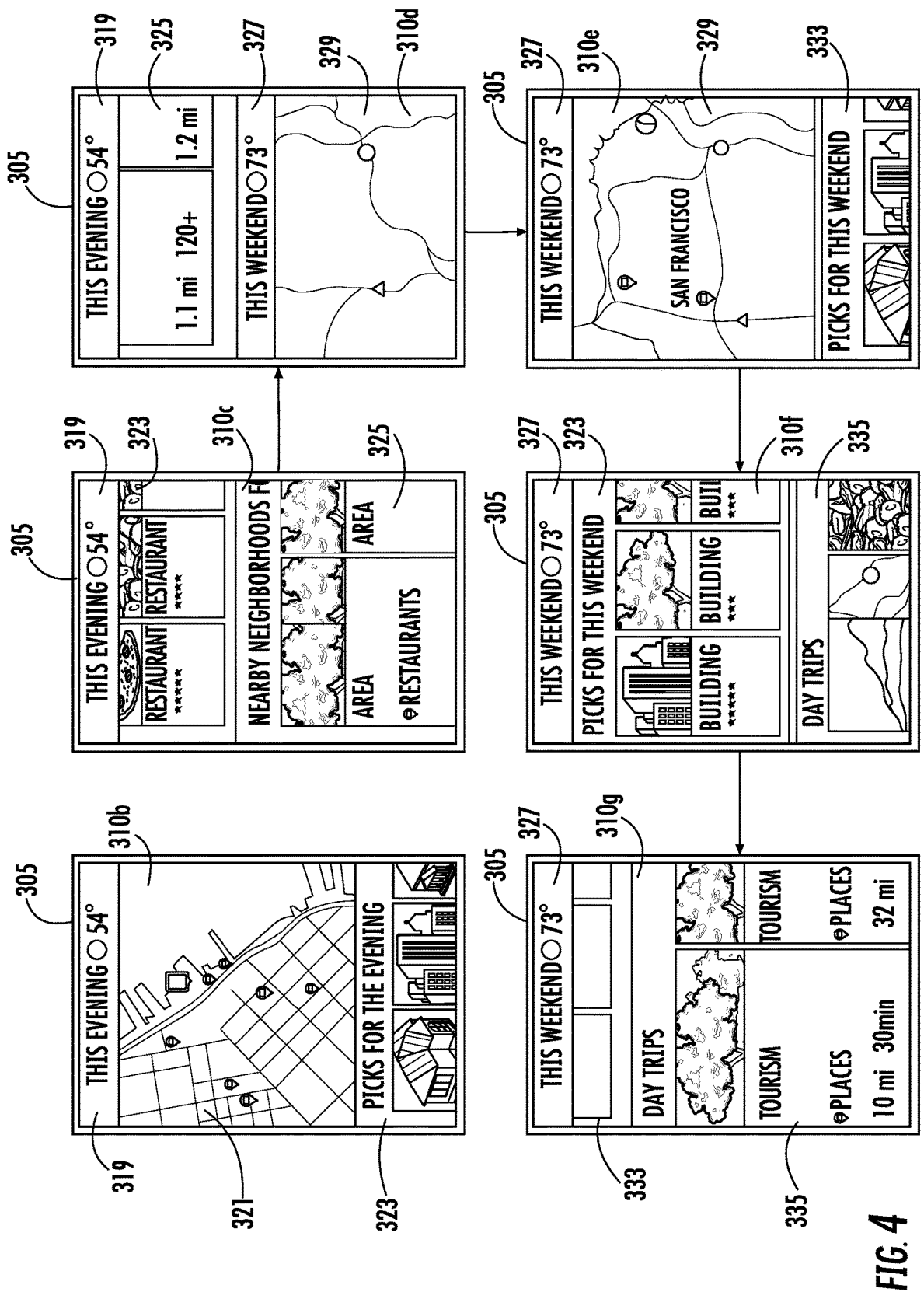
FIG. 4 depicts example scrolling of a user interface providing time based contextual information based on time proximity according to example embodiments of the present disclosure.

FIG. 4 depicts the vertical scrolling of a user interface to obtain information further in time proximity according to example embodiments of the present disclosure. For instance, user interface portion 310b contains contextual information associated with a time further in time proximity. In the example of FIG. 4, user interface portion 310b provides information associated with a relevant time group, "This Evening." The user interface portion 310b can include a banner interface element 319 indicating that the current information is associated with a particular time period, in this example "This Evening." The banner interface element 319 can provide other information, such as the weather for the time period. The banner interface element 319 can remain towards the top of the interface element during a vertical scrolling operation until information associated with the next time period is reached.

As shown, the user interface portion 310b depicts map imagery 321. Map imagery 321 is zoomed out relative to imagery 315 of FIG. 3. This is because a user has the ability to travel over a wider geographic region prior to time period associated with map imagery 321, namely "This Evening." In that regard, zoomed out map imagery is provided in the user interface 310b to provide additional relevant information to the user.

The user interface portion 310b also includes card interface elements 323. Card user interface elements 323 can provide information associated with time based contextual information. For instance, card user interface elements 323 can provide suggestions for "this evening." The suggestions can be, for instance, associated with restaurants, a place to grab dessert, a concert, or other event. A user can obtain more information about the suggestions via a user interaction with the card interface elements 323 (e.g., via a touch or click interaction).

User interface portion 310c is depicted after further vertical scrolling. As shown, user interface portion 310c still includes banner interface element 319. A top portion of card interface elements 323 are still visible. Card interface elements 325 have come into view. Card interface elements 325 can be associated with time based contextual information suitable for "This Evening." For example, as shown, card interface elements 325 can provide information associated with nearby neighborhoods for dinner. The geographic scope of the suggestions (e.g., nearby neighborhoods) can be determined based on time proximity to the relevant time. For instance, a user can travel to a nearby neighborhood by "This Evening." In that regard, the suggestions associated with card interface elements 325 can be associated with nearby neighborhoods.

User interface portion 310d is depicted after further vertical scrolling. As shown, user interface portion 310d still includes a top portion of card interface elements 325. A new banner interface element 327 associated with a different time period for contextual information (e.g., "This Weekend") has been scrolled into view. The banner interface element 327 can present information associated with a time period further in time proximity, such as "This Weekend." Additional information can be included with the banner interface element 327, such as the weather for the time period.

The user interface portion 310d depicts map imagery 329. Map imagery 321 is zoomed out relative to imagery 315 of FIG. 3 and imagery 329 provided in user interface portion 310b. This is because a user has the ability to travel over a wider geographic region prior to the time period associated with map imagery 329, namely "This Weekend." In that regard, zoomed out map imagery is provided in the user interface 310d to provide additional relevant information to the user.

User interface portion 310e is depicted after further vertical scrolling. User interface portion 310e still includes banner interface element 327 and map imagery 329. Card interface elements 333 have come into view. Card interface elements 333 can be associated with time based contextual information suitable for "This Weekend." For example, as shown, card interface elements 333 can provide information associated with suggestions for "This Weekend." The geographic scope of the suggestions can be determined based on time proximity to the relevant time. For instance, a user can travel to nearby cities by "This Weekend." In that regard, the suggestions associated with card interface elements 333 can be associated with nearby cities. A user can obtain more information associated with the suggestions via a user interaction with the card interface elements 333.

User interface portion 310f is depicted after further vertical scrolling. User interface portion 310f still includes banner interface element 327. Card interface elements 333 have been scrolled to the top of the user interface portion 310f. A portion of card interface elements 335 have come into view. Card interface elements 335 can provide suggestions for day trips for "This Weekend." A user can obtain more information associated with the suggestions via a user interaction with the card interface elements 335.

User interface portion 310g is depicted after further vertical scrolling. User interface portion 310g still includes banner interface element 327. Card interface elements 333 have almost been scrolled off screen. Card interface elements 335 have come into more prominent view in the user interface portion 310g.

The above example is discussed with reference to vertical scrolling for purposes of illustrations and discussion. Those of ordinary skill in the art, using the disclosures provided herein, will understand that other suitable user interactions can be used to navigate information in a user interface without deviating from the scope of the present disclosure.

In some embodiments, the user interface according to example aspects of the present disclosure can provide a user interface element for changing the relevant time either forward or backward in time relative to a current time or other time. As the relevant time is changes, one or more display configurations for user interface elements can be modified to facilitate interaction with the user interface elements based on time proximity to a user selected relevant time.

Figure 5:
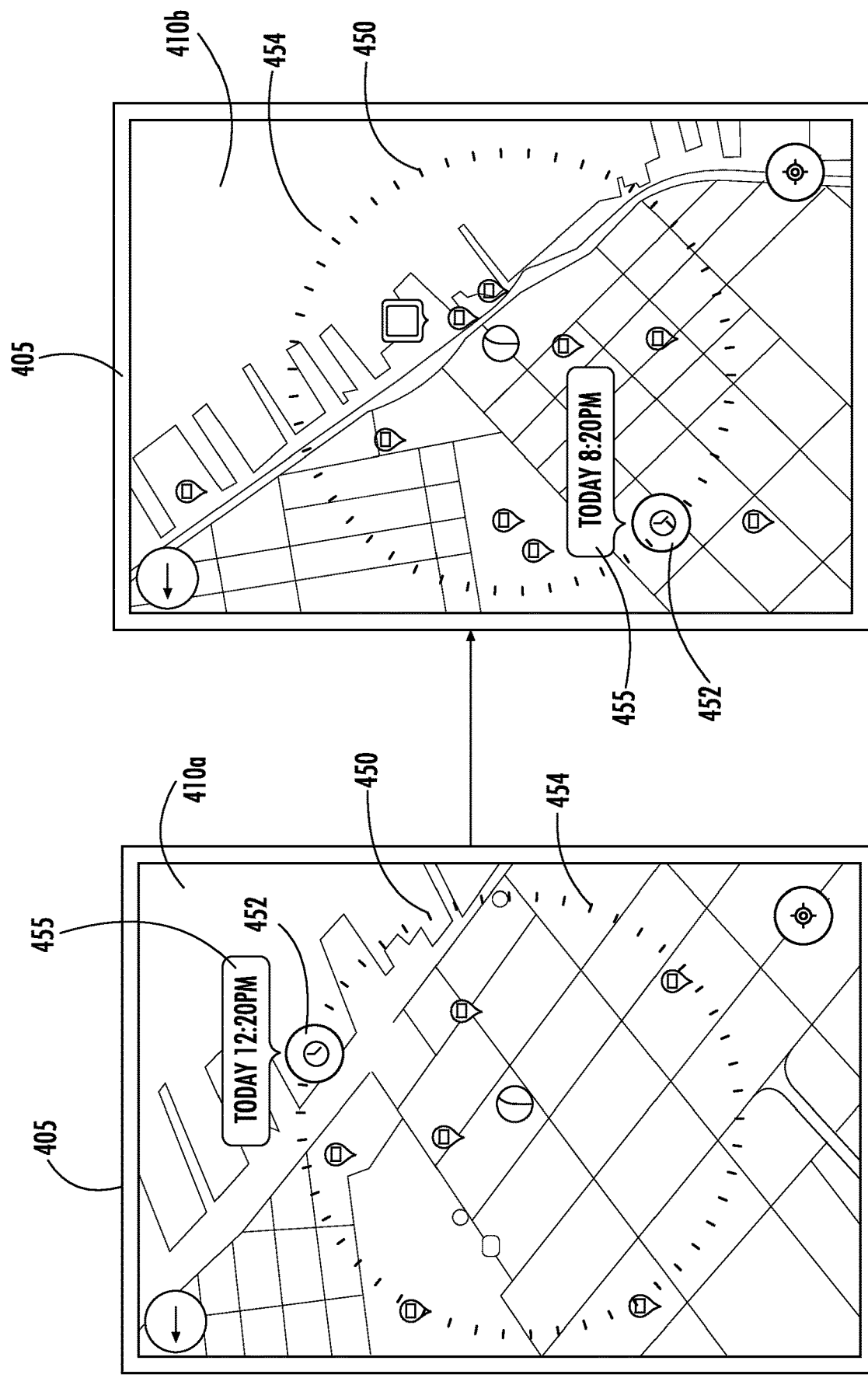
FIG. 5 depicts an example interface element for changing a relevant time according to example embodiments of the present disclosure.

FIG. 5 depicts a user interface 410a provided for display on a display device 405. The user interface 410a depicts geographic imagery 415 (e.g. map imagery) of a geographic area. The imagery 415 can include markers or other user interface elements for various points of interest.

A relevant time change interface element 450 can be presented in conjunction with the imagery 415. A user can interact with the relevant time change interface element 450 to change the relevant time (e.g., from a current time to a time in the future). By changing the relevant time, one or more display configurations for interface elements in the user interface 410a can also be changed based on time proximity to the selected relevant time. For instance, a color of the imagery 415, the markers displayed in conjunction with the imagery 415, the zoom level of the imagery 415, and/or the user interface treatment of one or more user interface elements can be modified as the user changes the relevant time.

In the example of FIG. 5, the relevant time change interface element 450 includes a circular element 454. The circular element 454 can include tick marks to approximate the appearance of a clock. A clock marker 452 can be controlled to move about the circular element 454. As the clock marker 452 is moved clockwise, the relevant time is modified forward. As the clock marker 452 is moved counterclockwise, the relevant time is changed backward. A callout element 455 can be provided in conjunction with the marker 452. The callout element 455 can display the relevant time associated with the current position of the marker 452.

In the example of FIG. 5, the marker 452 has been changed from a first position associated with a relevant time of "Today at 12:20 pm" to a second position associated with a relevant time of "Today at 8:20 pm." As shown in user interface 410b, the imagery 415 has been changed in response to the change in relevant time. More particularly, the imagery 415 has been zoomed out. In addition, different markers associated with points of interest more suitable for the relevant time are displayed in conjunction with the relevant time.

Figure 6:
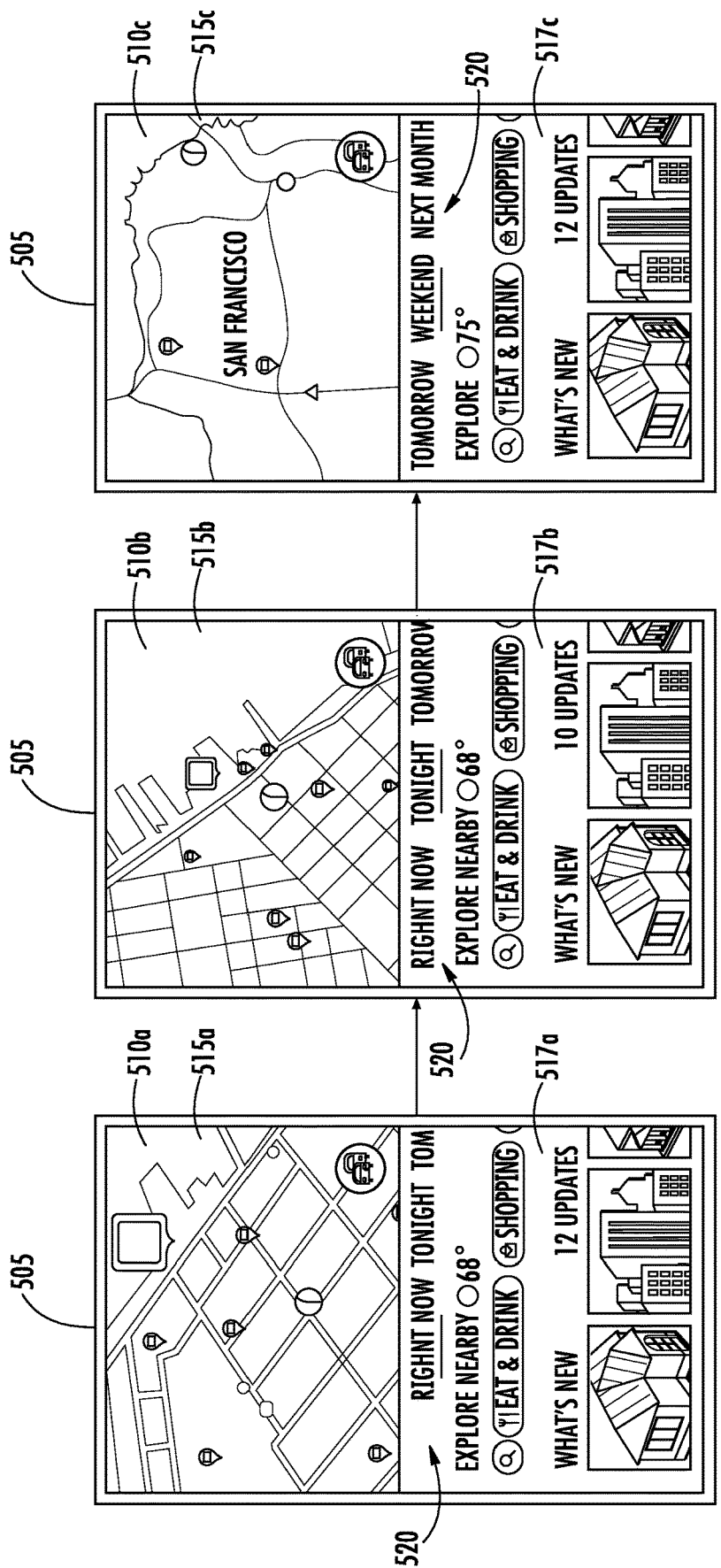
FIG. 6 depicts an example interface element for changing a relevant time according to example embodiments of the present disclosure.

Other suitable user interactions can be used to change the relevant time without deviating from the scope of the present disclosure. For example, FIG. 6 depicts example user interfaces 510a, 510b, and 510c. Each of the user interfaces 510a, 510b, and 510c can be associated with a different relevant time. In the example of FIG. 6, user interface 510a can be associated with "Right Now." User interface 510b can be associated with "Tonight." User interface 510c can be associated with "Weekend."

Each of the user interfaces 510a, 510b, and 510c can have different display configurations for its user interface elements. For instance, user interface 510a includes imagery 515a (e.g., map imagery). User interface 510b includes imagery 515b (e.g., map imagery). Imagery 515b is zoomed out relative to imagery 515a. In addition, imagery 515b displays markers and other information associated with different points of interest and events relative to imagery 515a. Imagery 515c is zoomed out relative to imagery 515b and 515a. In addition, imagery 515c displays markers and other information associated with different points of interests and events relative to imagery 515a and 515b.

User interface 510*a* includes card interface elements 517*a*. Card interface elements 517*a* can be associated with time-based contextual data (e.g., suggestions) for "Right Now." Card interface elements 517*b* can be associated with time-based contextual data (e.g., suggestions) for "Tonight." Card interface elements 517*c* can be associated with time-based contextual data (e.g., suggestions) for "Weekend."

A user can change the relevant time by interacting with tab interface element 520. Tab interface element 520 includes tabs for each of the relevant time periods, including "Right Now", "Tonight," "Tomorrow," "Weekend," "Next Month," etc. Other suitable time periods can be used without deviating from the scope of the present disclosure. A user can change the user interface (e.g., among user interface 510*a*, 510*b*, and 510*c*) by selecting a desired relevant time through interaction with the tab interface 520.

Figure 7:
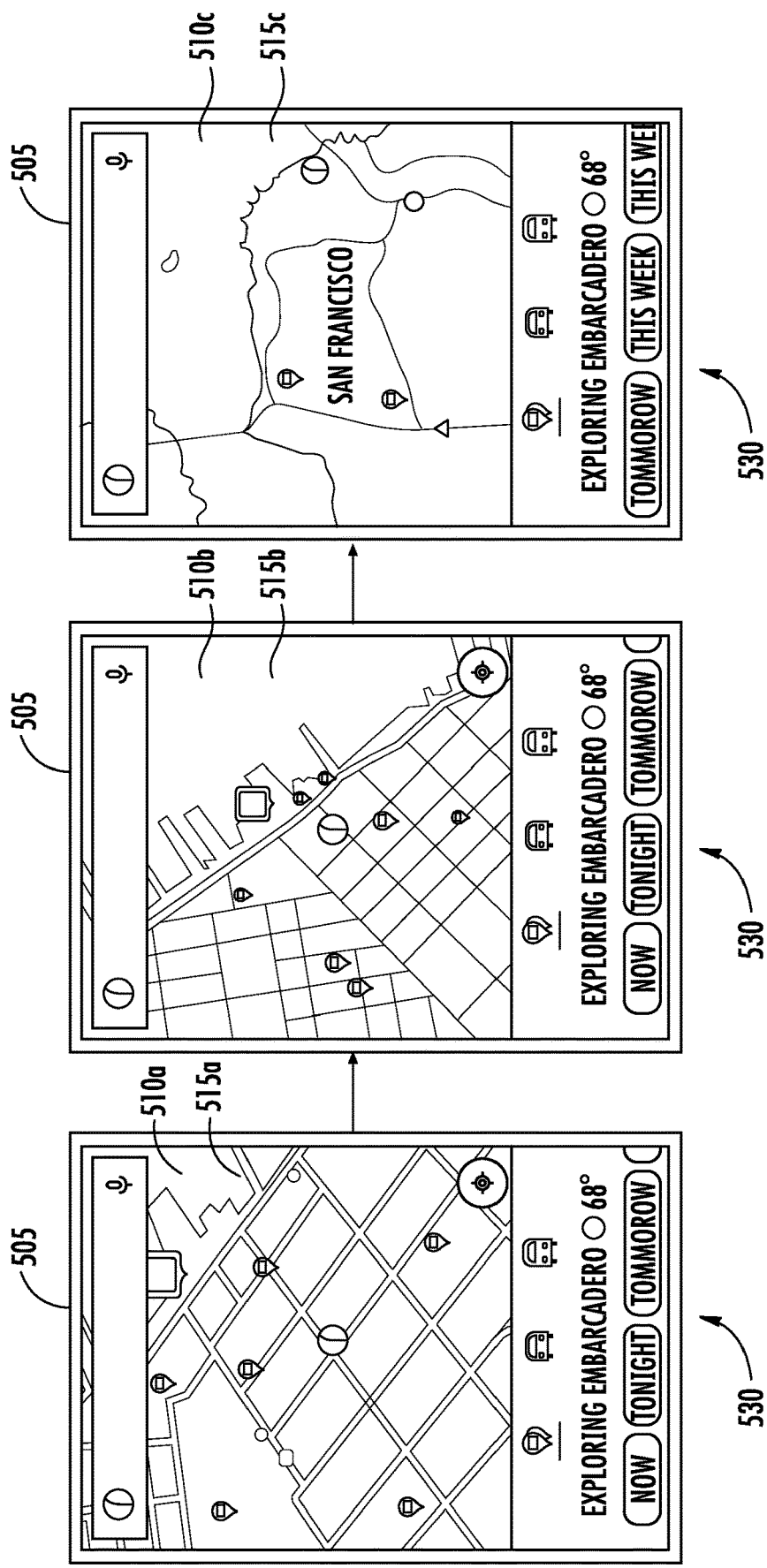
FIG. 7 depicts an example interface element for changing a relevant time according to example embodiments of the present disclosure.

FIG. 7 is similar to FIG. 6. However, in FIG. 7, a user can change the user interface (e.g., among user interface 510*a*, 510*b*, and 510*c*) through user interaction with a button interface 530. The button interface 530 can include buttons for each of the relevant time periods, including "Now," "Tonight," "Tomorrow," "This Week," "This Weekend," etc. Other suitable time periods can be used without deviating from the scope of the present disclosure. A user can change the user interface (e.g., among user interface 510*a*, 510*b*, and 510*c*) by selecting a desired relevant time through user interaction with the button interface 530.

Figure 8:
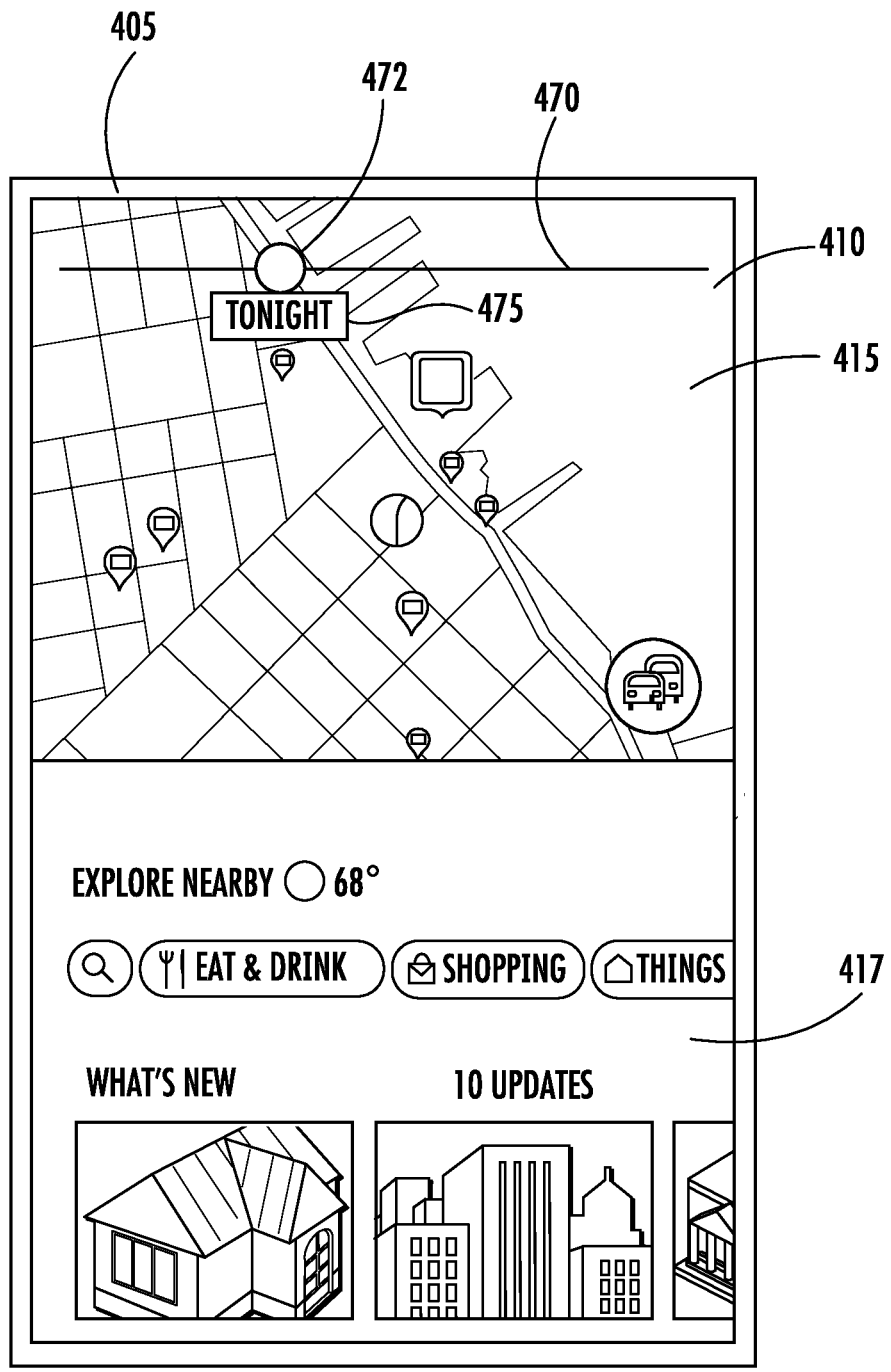
FIG. 8 depicts an example interface element for changing a relevant time according to example embodiments of the present disclosure.

FIG. 8 depicts a user interface 410 provided for display on a display device 405. The user interface 410 depicts geographic imagery 415 (e.g. map imagery) of a geographic area. The imagery 415 can include markers or other user interface elements for various points of interest.

A relevant time change interface element 470 can be presented in conjunction with the imagery 415. A user can interact with the relevant time change interface element 470 to change the relevant time (e.g., from a current time to a time in the future). By changing the relevant time, one or more display configurations for interface elements in the user interface 410 can also be changed based on time proximity to the selected relevant time. For instance, a color of the imagery 415, the markers displayed in conjunction with the imagery 415, the zoom level of the imagery 415, and/or the user interface treatment of one or more user interface elements can be modified as the user changes the relevant time.

In the example of FIG. 8, the relevant time change interface element 470 includes a horizontal scrubber interface element. A marker 472 can be controlled by user interaction to move horizontally along the interface element 470. As the marker 472 is moved in a first direction, the relevant time is changed forward. As the clock marker 472 is moved in a second direction, the relevant time is changed backward. A callout element 475 can be provided in conjunction with the marker 472. The callout element 475 can display the relevant time and/or time group associated with the current position of the marker 472.

Figure 9:
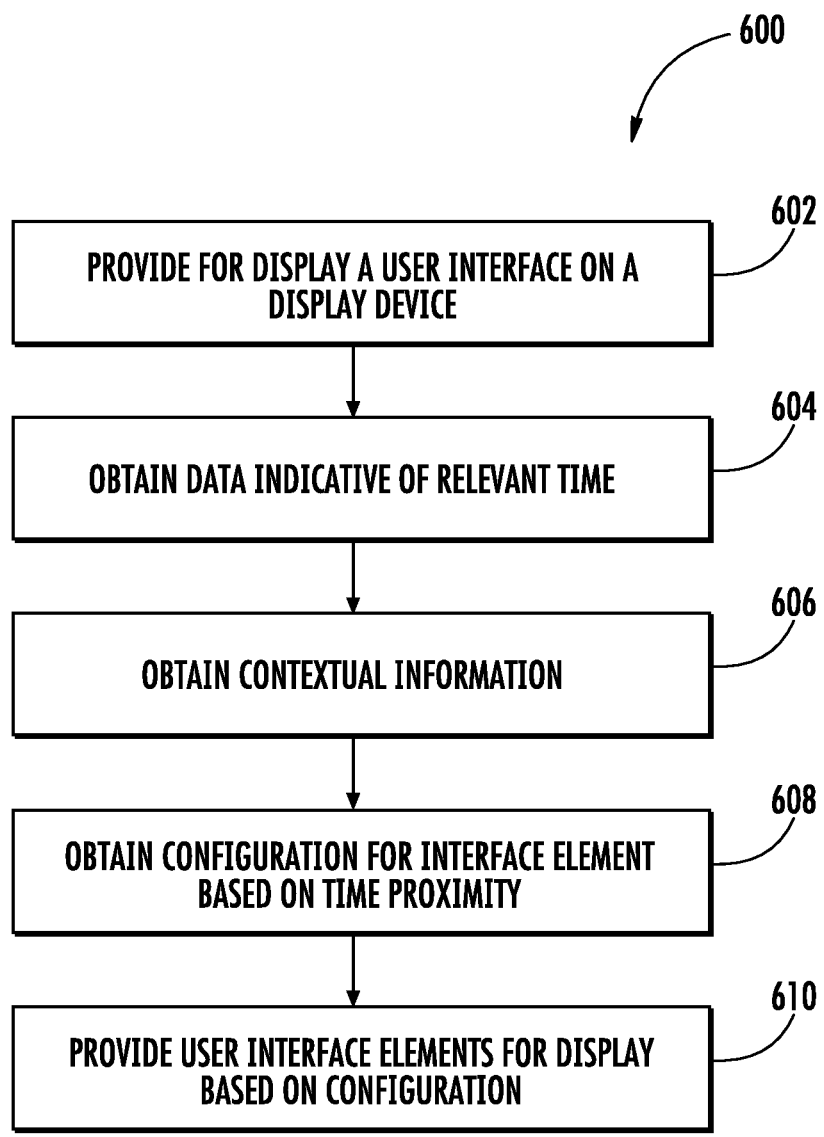
FIG. 9 depicts a flow diagram of an example method according to example embodiments of the present disclosure.

FIG. 9 depicts a flow diagram of an example method (600) according to example embodiments of the present disclosure. The method (600) can be implemented using one or more computing devices, such as one or more of the computing devices depicted in FIG. 11. FIG. 9 depicts steps performed in a particular order for purposes of illustration and discussion. Those of ordinary skill in the art, using the disclosures provided herein, will understand that various steps of any of the methods disclosed herein can be adapted, expanded, rearranged, omitted, performed simultaneously, and/or modified in various ways without deviating from the scope of the present disclosure. As used herein, the use of the term "obtaining" in conjunction with data and/or information can include receiving, determining, calculating, accessing, reading or otherwise obtaining data.

At (602), the method can include providing for display a user interface on a display device. The user interface can be associated with a GIS application, such as a mapping application. The user interface can display imagery of the geographic area, such map imagery, satellite imagery, aerial imagery, three-dimensional models, street level imagery, or other imagery depicting a geographic area. The imagery can be obtained, for instance, from a geographic information system database or other database (e.g., over a network). In addition and/or in the alternative, the imagery can be obtained, for instance, from local memory storage on a computing device implementing the GIS application.

At (604), the method can include obtaining data indicative of a relevant time. The data indicative of the relevant time can be data indicative of the current time (e.g., from a real time clock). Alternatively, the data indicative of a relevant time can be an modified relevant time as determined from a user interaction with the user interface (e.g., via a relevant time change interface element).

At (606), the method can include obtaining contextual information for display in conjunction with the imagery. The contextual information can include, for instance, information associated with dinner reservations, travel information (e.g., flight times), calendar information (e.g., meetings, appointments, etc.), events (e.g., concerts, festivals, fairs, rallies), suggested activities, suggested trips, etc. For instance, in some embodiments, the contextual information can be associated with personalized information of a user, such as a user's appointments, commute, schedule, calendar, reservations, etc. The contextual information can be associated with a particular date and time. The contextual information can be obtained, for instance, from a geographic information system database or other database (e.g., over a network). In addition and/or in the alternative, the contextual information can be obtained, for instance, from local memory storage on a computing device implementing the GIS application.

At (608), the method can include obtaining a configuration for one or more user interface elements associated with the contextual information based on time proximity of the contextual information to the relevant time. For instance, UI logic implemented by the GIS application can configure user interface elements based on time proximity to prioritize and/or emphasize user interface elements closer in time proximity to the relevant time. Example configurations for user interface elements obtained based on time proximity are discussed with reference to FIGS. 2-8.

At (610), the method can include providing for display the user interface elements in the user interface based on the obtained configuration. In some embodiments, the one or more user interface elements are capable of receiving a user interaction via the user interface. In this way, the user interface elements can be arranged for more efficient interaction with the user interface and use of computing resources dedicated to receiving user inputs.

Figure 10:
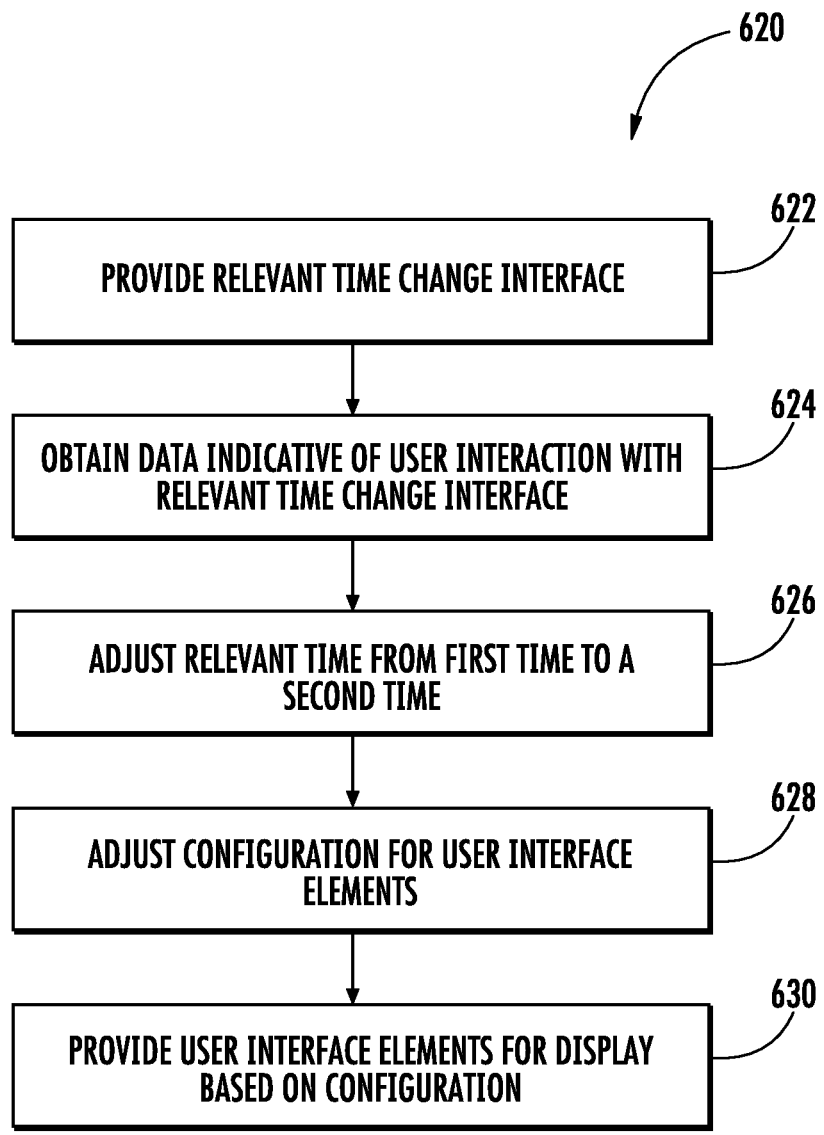
FIG. 10 depicts a flow diagram of an example method according to example embodiments of the present disclosure.

FIG. 10 depicts a flow diagram of an example method (620) for changing a relevant time via a relevant time change interface according to example embodiments of the present disclosure. The method (620) can be implemented using one or more computing devices, such as one or more of the computing devices depicted in FIG. 11. FIG. 10 depicts steps performed in a particular order for purposes of illustration and discussion. Those of ordinary skill in the art, using the disclosures provided herein, will understand that various steps of any of the methods disclosed herein can be adapted, expanded, rearranged, omitted, performed simultaneously, and/or modified in various ways without deviating from the scope of the present disclosure.

At (622), the method includes providing for display a relevant time change interface in the user interface. Example relevant time change interfaces are illustrated in FIGS. 5-8. At (624), the method can include obtaining data indicative of a user interaction with the relevant time change interface. For instance, a user can interact with the relevant time change interface using a gesture (e.g., a touch gesture) to signify a change to the relevant time.

At (626), the method can include changing the relevant time from a first time to a second time. As one example, the relevant time can be changed from a current time to a time in the future, such as a relevant time associated with this weekend. At (628), the method can include changing the configuration of user interface elements based on the modified relevant time. For instance, the configuration of user interface elements can be changed based on time proximity to the changed relevant time to prioritize and/or emphasize user interface elements closer in time proximity to the relevant time.

At (630), the method can include providing for display the user interface elements in the user interface based on the configuration. In some embodiments, the one or more user interface elements are capable of receiving a user interaction via the user interface. In this way, the user interface elements can be arranged for more efficient interaction with the user interface and use of computing resources dedicated to receiving user inputs.

Figure 11:
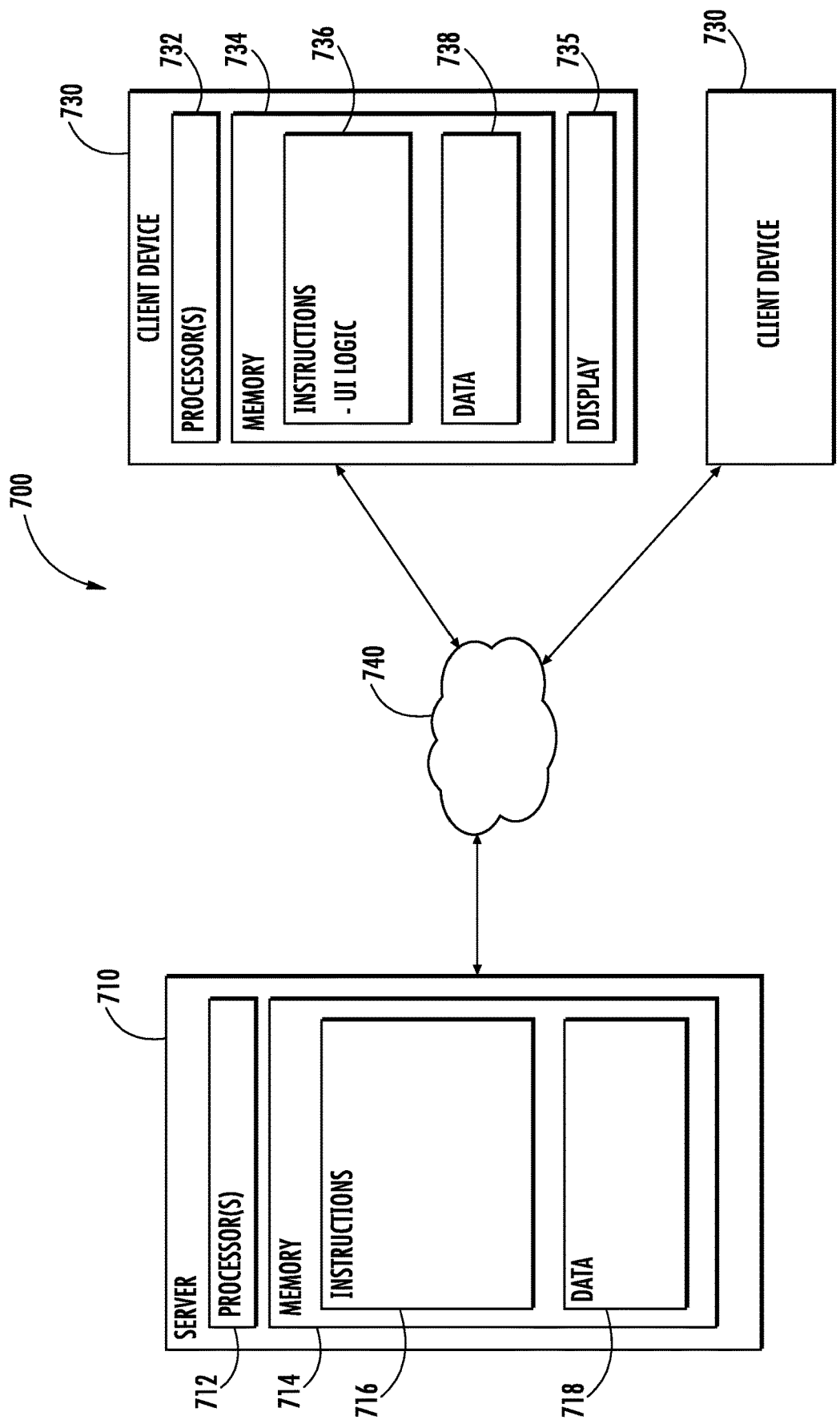
FIG. 11 depicts an example computing system according to example embodiments of the present disclosure.

FIG. 11 depicts an example computing system 700 that can be used to implement one or more aspects of the present disclosure. The system 700 can be implemented using a client-server architecture that includes a server 710 that communicates with one or more client devices 730 over a network 740. The system 700 can be implemented using other suitable architectures, such as a single computing device.

The system 700 includes a server 710, such as a web server. The server 710 can host a geographic information system, such as a geographic information system associated with a mapping service. The server 710 can be implemented using any suitable computing device(s). The server 710 can have one or more processors 712 and one or more memory devices 714. The server 710 can also include a network interface used to communicate with one or more client devices 730 over the network 740. The network interface can include any suitable components for interfacing with one more networks, including for example, transmitters, receivers, ports, controllers, antennas, or other suitable components.

The one or more processors 712 can include any suitable processing device, such as a microprocessor, microcontroller, integrated circuit, logic device, or other suitable processing device. The one or more memory devices 714 can include one or more computer-readable media, including, but not limited to, non-transitory computer-readable media, RAM, ROM, hard drives, flash drives, or other memory devices. The one or more memory devices 714 can store information accessible by the one or more processors 712, including computer-readable instructions 716 that can be executed by the one or more processors 712. The instructions 716 can be any set of instructions that when executed by the one or more processors 712, cause the one or more processors 712 to perform operations.

As shown in FIG. 11, the one or more memory devices 714 can also store data 718 that can be retrieved, manipulated, created, or stored by the one or more processors 712. The data 718 can include, for instance, map data, contextual data, and/or other data. The data 718 can be stored in one or more databases. The one or more databases can be connected to the server 710 by a high bandwidth LAN or WAN, or can also be connected to server 710 through network 740. The one or more databases can be split up so that they are located in multiple locales.

The server 710 can exchange data with one or more client devices 730 over the network 740. Although two client devices 730 are illustrated in FIG. 11, any number of client devices 730 can be connected to the server 710 over the network 740. Each of the client devices 730 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 710, a client device 730 can include one or more processor(s) 732 and a memory 734. The one or more processor(s) 732 can include one or more central processing units (CPUs), graphics processing units (GPUs), and/or other processing devices. The memory 734 can include one or more computer-readable media and can store information accessible by the one or more processors 732, including instructions 736 that can be executed by the one or more processors 732 and data 738. For instance, the memory 734 can store instructions 736 for implementing UI logic as discussed with reference to FIG. 1.

The client device 730 of FIG. 11 can include various input/output devices for providing and receiving information from a user, such as a touch screen, touch pad, data entry keys, speakers, and/or a microphone suitable for voice recognition. For instance, the client device 730 can have a display device 735 for display a user interface configured based on time proximity according to example aspects of the present disclosure.

The client device 730 can also include a network interface used to communicate with one or more remote computing devices (e.g. server 710) over the network 740. The network interface can include any suitable components for interfacing with one or more networks, including for example, transmitters, receivers, ports, controllers, antennas, or other suitable components.

The network 740 can be any type of communications network, such as a local area network (e.g. intranet), wide area network (e.g. Internet), cellular network, or some combination thereof. The network 740 can also include a direct connection between a client device 730 and the server 710. In general, communication between the server 710 and a client device 730 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for processing user interface elements for contextual information in a geographic information system, the method comprising:
    providing for display, by one or more computing devices, a user interface on a display device, the user interface displaying imagery of a geographic area;
    obtaining, by the one or more computing devices, data indicative of a relevant time for contextual information;
    obtaining, by the one or more computing devices, time based contextual information associated with the geographic area;
    determining, by the one or more computing devices, a configuration based at least in part on time proximity of the contextual information to the relevant time;
    providing, for display in the user interface, by the one or more computing devices, one or more user interface elements associated with the time based contextual information and capable of receiving a user interaction;
    organizing, by the one or more computing devices, the one or more user interface elements based at least in part on the configuration,
    wherein determining the configuration for the user interface element occurs after a user interaction to change the relevant time from a first time to a second time, and
    wherein in response to receiving a user interaction with one of the one or more user interface elements the user interface is modified to show details or other interface elements associated with the contextual information.

2. The computer-implemented method of claim 1, wherein the user interface element is capable of receiving a user interaction via the user interface.

3. The computer-implemented method of claim 1, wherein the relevant time comprises a current time.

4. The computer-implemented method of claim 1, wherein the method comprises changing, by the one or more computing devices, the configuration for the user interface element as the relevant time changes from a first time to a second time, the second time being later than the first time.

5. The computer-implemented method of claim 4, wherein changing, by the one or more computing devices, the configuration for the user interface element comprises changing, by the one or more computing devices, a user interface treatment of the contextual information.

6. The computer-implemented method of claim 1, wherein the method comprises changing, by the one or more computing devices, the imagery displayed in the user interface as the relevant time changes from a first time to a second time.

7. The computer-implemented method of claim 6, wherein changing, by the one or more computing devices, the imagery comprises zooming the imagery.

8. The computer-implemented method of claim 1, wherein the method comprises:
    obtaining, by the one or more computing devices, data indicative of a first type of user interaction directed to the user interface,
    in response to obtaining, by the one or more computing devices, data indicative of a first type of user interaction, providing for display, by the one or more computing devices, different user interface elements associated with contextual information further in time proximity to the relevant time.

9. The method of claim 8, wherein the first type of user interaction comprises a vertical scrolling user interaction.

10. The method of claim 1, wherein the method comprises:
    obtaining, by the one or more computing devices, data indicative of a second type of user interaction directed to the user interface; and
    in response to obtaining, by the one or more computing devices, data indicative of a second type of user interaction:
        changing, by the one or more computing devices, the relevant time from a first time to a second time; and
        changing, by the one or more computing devices, the configuration for the user interface element when the relevant time changes from the first time to the second time.

11. The method of claim 10, wherein the method comprises providing for display, by the one or more computing devices, a relevant time change interface element configured to receive the second type of user interaction for changing the relevant time.

12. The method of claim 11, wherein the relevant time change interface element comprises a circular interface element, wherein the second type of user interaction comprises changing a position of a marker about the circular interface element.

13. The method of claim 1, wherein the configuration is obtained, at least in part, based at least in part on data indicative of a user familiarity with the geographic area.

14. A computing system, comprising:
    a display device;
    one or more processors; and
    one or more memory devices, the memory devices storing computer-readable instructions that when executed by the one or more processors cause the one or more processors to perform operations, the operations comprising:
        providing for display a user interface on the display device, the user interface displaying imagery of a geographic area;
        obtaining data indicative of a relevant time for display of contextual information;
        obtaining contextual information associated with the geographic area;
        determining a configuration based at least in part on time proximity of the contextual information to the relevant time;
        providing, for display in the user interface, one or more user interface elements associated with the contextual information and capable of receiving a user interaction, wherein in response to receiving a user interaction with one of the one or more user interface elements the user interface is modified to show details or other interface elements associated with the contextual information;

organizing the one or more user interface elements based at least in part on the configuration; and obtaining a user interaction directed to a relevant time change interface element;

in response to the user interaction:

changing the relevant time from a first time to a second time; and changing the configuration for at least one of the user interface elements when the relevant time changes from the first time to the second time.

15. The system of claim 14, wherein the relevant time change interface element comprises a circular element, wherein the user interaction comprises changing a position of a marker about the circular element.

16. The system of claim 14, wherein the relevant time change interface element comprises a tab interface element.

17. The system of claim 14, wherein the relevant time change interface element comprises a button interface element.

18. The system of claim 14, wherein the relevant time change interface element comprises a horizontal scrubber interface element.

19. One or more tangible, non-transitory computer-readable media storing computer-readable instructions that when executed by one or more processors cause the one or more processors to perform operations, the operations comprising:

providing for display a user interface on a display device, the user interface displaying imagery of a geographic area;

obtaining data indicative of a relevant time for display of contextual information;

obtaining contextual information associated with the geographic area;

determining one or more display configurations based at least in part on time proximity of the contextual information to the relevant time;

providing for display in the user interface a plurality of user interface elements associated with the contextual information and capable of receiving a user interaction, wherein in response to receiving a user interaction with one of the plurality of user interface elements the user interface is modified to show details or other interface elements associated with the contextual information;

organizing the plurality of user interface elements associated with the contextual information based at least in part on the one or more display configurations;

wherein the plurality of user interface elements are arranged in the user interface based at least in part on a time proximity of contextual information to a relevant time period, and wherein obtaining the one or more display configurations for the user interface elements occurs after a user interaction to change the relevant time from a first time to a second time.

20. The one or more tangible, non-transitory computer-readable media of claim 19, wherein the plurality of user interface elements are grouped by time proximity into a plurality of relevant time groups.

* * * * *